Patented Sept. 12, 1944

2,358,133

UNITED STATES PATENT OFFICE 2,358,133

PREPARATION OF TRIARYL PHOSPHATES

Wesley C. Stoesser and Alexander H. Widiger, Jr., Midland, Mich., assignors to The Dow Chemical Company, Midland, Mich., a corporation of Michigan No Drawing. Application June 18, 1941, Serial No. 398,572

4 Claims. (Cl. 260—461)

This invention relates to an improved method for the manufacture of triaryl phosphates, particularly in forms free of acids and acid-forming impurities.

Triaryl phosphates are usually prepared by heating three molecular proportions of a phenol with one molecular proportion of a phosphorus oxyhalide, usually the oxychloride, and frequently in the presence of a metal salt catalyst. Mixed triaryl phosphates containing two or three different aryl groups in the molecule may be readily prepared by reacting phosphorus oxychloride simultaneously or consecutively with the necessary phenols. After the completion of the reaction, purification is usually accomplished by washing the reacted mixture with a dilute solution of an acid such as hydrochloric acid to remove traces of metal salts and with a dilute solution of an alkali such as sodium hydroxide to remove acidic constituents and finally with water. The washed material is then either distilled or crystallized.

In the preparation of triaryl phosphates by this usual method it is difficult to secure a product which is entirely free from acids or acid-producing substances. This may be due to the formation in the reaction mixture of small amounts of compounds in which a part of the halogen in some of the phosphorus oxyhalide has not been replaced with an aryl group and to the gradual decomposition of such compounds in the presence of moisture or under the influence of heat to liberate a hydrogen halide or phosphoric acid. The presence of such acid-producing substances is undesirable, since the phosphate products are often used for purposes where the presence of even a trace of acid is harmful. This is particularly true when the triaryl phosphates are used as plasticizers for resins.

We have found that the triaryl phosphates may readily and economically be produced in a form substantially free of acids and acid-producing impurities by reacting together the phosphorus oxyhalide and phenol, or phenols, as usual, to form the desired triaryl phosphate and blowing the crude reaction mixture with steam. The steaming facilitates removal of the halogen-containing or other acid-producing impurities, apparently by effecting rapid hydrolysis or decomposition of such impurities into compounds which are readily removed from the phosphate product, e. g., by distillation or the usual washing operations.

Steaming of the crude product is carried out at temperatures between 100° and 200° C., usually between 120° and 190° C., and preferably between 140° and 160° C. It is usually sufficient to carry on the steaming process for from 15 to 30 minutes, although the time required depends somewhat upon the temperature, the rate of flow of the steam, and the nature and amount of the impurities present. Steaming at too high a temperature or for too long a period may result in excessive hydrolysis of the triaryl phosphate, and such a condition should, of course, be avoided. Under the stated conditions hydrolysis of the triaryl phosphate is practically negligible. Although the mixture may be steamed after washing, it is preferably steamed before being washed since the washing operations then serve to remove any alkali- or acid-soluble compounds formed during the steaming. Alternatively, the hot crude phosphate product may be agitated with water at atmospheric or superatmospheric pressure, e. g., in an autoclave and at the above reaction temperatures, to cause reaction between the water and the impurities and convert the latter into compounds readily removable from the phosphate product.

After the treatment with steam or hot water is completed the mixture is preferably washed successively, and usually at 60°–70° C., with a dilute aqueous acid solution, e. g., a 1.0 per cent solution of hydrogen chloride, a dilute aqueous alkali solution, e. g., a 1.0 per cent solution of sodium hydroxide, and water, and then distilled. Other water-soluble alkalies or mineral acids, e. g., $Na_2CO_3$, KOH, $K_2CO_3$, or $H_2SO_4$, etc., may be used in the washing operations if desired. Removal of the metal salt catalyst is facilitated by washing with dilute acid, and sufficient dilute alkali should preferably be used to neutralize all free acid in the crude phosphate product. Any unreacted phenols may at least partially be removed by washing with alkali. Any remaining trace of alkali may be removed by the water wash. The distillation is usually carried out under vacuum and preferably in such a manner that a fore-fraction containing water and any unreacted phenol is collected and either discarded or subsequently reworked to recover the phenol. A pure triaryl phosphate fraction containing substantially no free acids or easily decomposable acid-producing substances is then collected.

Certain of the advantages of the invention will be seen from the following examples, which are illustrative and are not to be constructed as limiting the invention:

EXAMPLE 1

A series of batches of crude triphenyl phosphate were prepared by reacting together three molecular proportions of phenol and one molecular proportion of phosphorus oxychloride and each crude reacted mixture was divided into two equal parts. One part of each batch was submitted to purification in the ordinary manner, i. e., by washing successively at 60°–70° C. with an equal volume of a 1.0 per cent hydrochloric acid solution, an equal volume of a 1.0 per cent aqueous sodium hydroxide solution, and an equal volume of water. The other part of each batch was heated to 155°–160° C., steam was slowly passed through it for 15 minutes, after which it was cooled to 60°–70° C., and washed in the same manner. After washing, the acidity of each product was determined. The product was then fractionally distilled under vacuum. A small fore-fraction was first collected and the triphenyl phosphate was then collected separately. The acidity of each fraction of distillate was determined by analysis. The acidity values, calculated as weight per cent of $H_3PO_4$ and assuming that the latter reacts as a dibasic acid, are listed below in Table I. The unsteamed portions contained appreciable quantities of free acid before distilling and this free acid persisted in both the fore-fractions and the triphenyl phosphate fractions. In the case of the steamed portions, the amount of free acid present before distilling was extremely low, and the amount of acid carried over into the triphenyl phosphate fractions was so small as to be in most cases scarcely detectable.

Table I

| Percent acid calculated as $H_3PO_4$ | Experiment 1 | | Experiment 2 | | Experiment 3 | |
|---|---|---|---|---|---|---|
| | Unsteamed | Steamed | Unsteamed | Steamed | Unsteamed | Steamed |
| In undistilled portion | .0700 | .0000 | .0080 | .0000 | .0007 | .0002 |
| In fore-fraction | .2240 | .0004 | .3720 | .0004 | .0235 | .0006 |
| In triphenyl phosphate | .0020 | .0000 | .0035 | .0000 | .0020 | .0000 |

Example 2

Three mols of phenol was heated together with about one-half per cent of substantially anhydrous magnesium chloride to 95°–105° C. and one mol of phosphorus oxychloride was added gradually. The temperature was raised gradually to 155° C., at which temperature the reaction was finished. Steam was blown slowly through the reacted mixture for twenty minutes while maintaining the temperature at 155°–160° C. The product was cooled to 65° C. and washed successively with an equal volume each of a 1.0 per cent hydrochloric acid solution, a 1.0 per cent sodium hydroxide solution, and water. The product was then distilled under vacuum and a small fore-fraction consisting principally of water and unreacted phenol collected separately. The triphenyl phosphate fraction was substantially free from acid or substances easily decomposable to form acids.

Other modes of applying the principle of the invention may be employed instead of the one explained, change being made as regards the method herein disclosed, provided the step or steps stated by any of the following claims or the equivalent of such stated step or steps be employed.

We therefore particularly point out and distinctly claim as our invention:

1. In a method of making a triaryl phosphate wherein a phenolic compound is reacted with phosphorus oxychloride, the steps which comprise blowing steam through the reacted mixture while maintaining the latter at a temperature between 120° and 190° C. whereby acid-forming ingredients are selectively decomposed, and then washing the mixture with aqueous alkali to remove acidic ingredients from the triaryl phosphate.

2. In a method of making a triaryl phosphate wherein a phenolic compound is reacted with phosphorus oxychloride, the steps which comprise blowing steam through the reacted mixture while maintaining the latter at a temperature between 140° and 170° C. whereby acid-forming ingredients are selectively decomposed, and then washing the mixture with aqueous alkali to remove acidic ingredients from the triaryl phosphate.

3. In a method of making triphenyl phosphate wherein phenol is reacted with phosphorus oxychloride, the steps which comprise blowing steam through the reacted mixture while maintaining the latter at a temperature between 120° and 190° C. whereby acid-forming ingredients are selectively decomposed, and then washing the mixture with aqueous alkali to remove acidic ingredients from the triphenyl phosphate.

4. In a method of making a triaryl phosphate wherein a phenolic compound is reacted with phosphorus oxychloride, the steps which comprise treating the reacted mixture with water at a temperature between 120° and 190° C. whereby acid-forming ingredients are selectively decomposed, and then washing the mixture with aqueous alkali to remove acidic ingredients from the triaryl phosphate.

WESLEY C. STOESSER.
ALEX. H. WIDIGER, Jr.